United States Patent [19]
Ortega et al.

[11] Patent Number: 5,047,218
[45] Date of Patent: Sep. 10, 1991

[54] SWEETENING OF SULFUR-CONTAINING GASES USING OZONE

[75] Inventors: Pedro C. Ortega, Los Teques; Dino V. Brunasso, Anzoategui; Luis M. Cabrera V., Los Teques Edo. Hiranda, all of Venezuela

[73] Assignee: Intevep, S.A., Caracas, Venezuela

[21] Appl. No.: 292,234

[22] Filed: Dec. 30, 1988

[51] Int. Cl.$^5$ ............... C01B 17/16; C01B 31/20; C01B 17/00; C01C 1/24
[52] U.S. Cl. ................... 423/224; 423/242; 423/545; 423/555
[58] Field of Search ............... 423/224, 242 A, 242 R, 423/243, 244 A, 545, 555

[56] References Cited

U.S. PATENT DOCUMENTS

| | | | |
|---|---|---|---|
| 2,926,999 | 3/1960 | Tarbutton et al. | 423/242 |
| 4,156,712 | 5/1979 | Kanai et al. | 423/224 |

FOREIGN PATENT DOCUMENTS

| | | | |
|---|---|---|---|
| 55-152523 | 11/1980 | Japan | 423/224 |
| 56-15824 | 2/1981 | Japan | 423/224 |

*Primary Examiner*—Gregory A. Heller
*Attorney, Agent, or Firm*—Dressler, Goldsmith, Shore, Sutker & Milnamow, Ltd.

[57] ABSTRACT

A process which reduces the amount of sulfur compounds present in a feed gas is disclosed. A gas containing sulfur compounds is admixed with an ozone-containing gas. This admixture is then contacted with a scrubbing composition to obtain a gas and a product solution. The gas exhibiting a significant reduction in sulfur compounds as compared to the feed gas. The product solution yields a sulfate-containing compound.

19 Claims, 2 Drawing Sheets

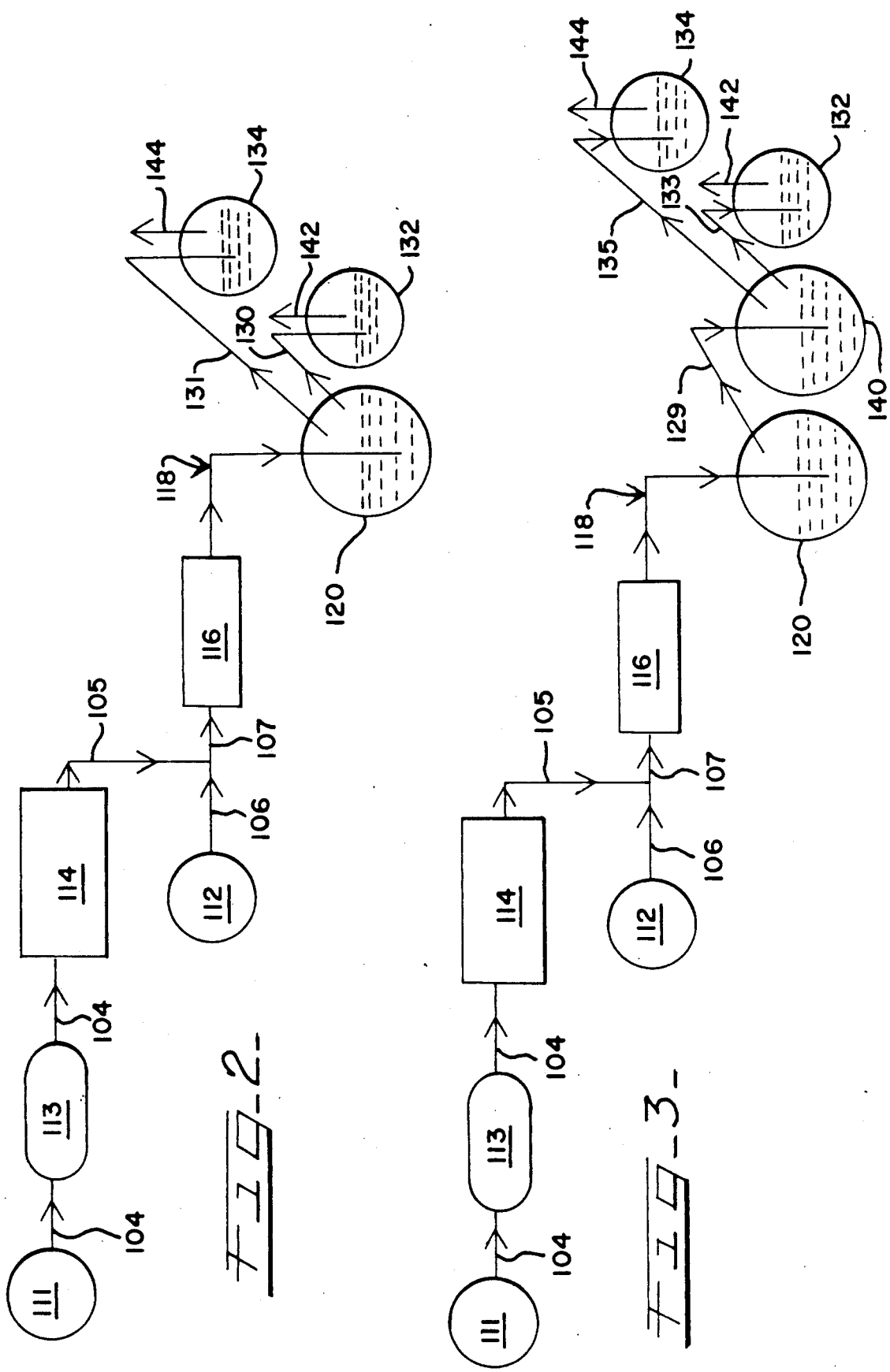

SWEETENING OF SULFUR-CONTAINING GASES USING OZONE

TECHNICAL FIELD

This invention relates to the removal of sulfur from natural and industrial gases and in particular to removing the sulfur using ozone and a scrubber solution to obtain a gas having a reduced sulfur content. A sulfate-containing compound suitable for use as an agricultural fertilizer is also obtained.

BACKGROUND OF THE INVENTION

The presence of sulfur in gases is undesirable because of its noxious odor, toxicity, and corrosive properties. Furthermore, sulfur is undesirable because it is a source of atmospheric pollution. The processes whereby the sulfur is removed from the gas are generically known as "sweetening".

Removal of sulfur compounds from gas streams has been of considerable importance in the past and is even more important today due to environmental considerations.

Numerous natural gas wells produce what is known as "sour gas". Sour gas is natural gas that contains sulfur compounds such as hydrogen sulfide. Considerable effort has been expended to find effective and cost efficient means of removing these sulfur compounds from natural gas.

Gas a effluent from the combustion of organic materials, such as oil and coal, also usually contains sulfur compounds. With increasing emphasis on the elimination of sulfur discharged to the atmosphere it has become very desirable to remove the sulfur compounds from the effluent.

Sulfur is also present in many gas streams which are the result of petroleum refining and manufacturing.

These gases have often been treated by using various absorption-desorption processes. Illustrative absorption-desorption processes are the hot potassium carbonate process, the vacuum carbonate process, the amine process (especially those utilizing mono-, di-, and triethanolamine), and various other processes using organic solvents. However, these processes, while effective in reducing the sulfur content to a low level, require the gases recovered from the process to be further treated to lower the sulfur content to a satisfactory level.

Furthermore, these processes are generally carried out at elevated temperatures and pressures which increase operating expenses and the dangers of utilizing these processes. For example, the amine process utilizes a temperature of about 40° C. in the absorption stage and about 120° C. in the solvent regeneration stage. The hot potassium carbonate process utilizes a pressure in excess of 250 psi.

Frequently, these recovered gases from the absorption step have been used to produce elemental sulfur by some variation of the Claus process. In this process a portion of the sulfur removed, usually in the form of hydrogen sulfide, is oxidized to sulfur dioxide and this sulfur dioxide and the remaining hydrogen sulfide are reacted in a catalytic converter to form elemental sulfur and water.

The Claus and related processes for recovering elemental sulfur have a disadvantage in that there is invariably a residue of gas, known as the tail gas, in which either sulfur dioxide or hydrogen sulfide, or frequently both, remain. This tail gas is usually discharged into the atmosphere which is highly undesirable as this results in pollution of the environment.

Alternatively, the tail gas or other gases are processed by catalytic oxidation of hydrogen sulfide with oxygen as illustrated in U.S. Pat. No. 4,311,683 to Hass et al. The sulfur thus removed is in the form of elemental sulfur. However, this process requires an elevated temperature of about 120° to about 235° C. (about 250° to about 450° F.) and a catalyst, both of which are undesirable.

The reaction between hydrogen sulfide and ozone in air has been described by Hales et al., *Atmospheric Environment*, Vol. 3, Pergamon Press, London, Great Britain (1969), pp. 657–667.

While there are many industrial uses for sulfur, one of the most important uses is in sulfate-containing compounds suitable for use as agricultural fertilizers. Ammonium sulfate is a desirable fertilizer. Unfortunately, with the prior processes, the elemental sulfur must be further processed to produce the sulfate-containing compound.

A process wherein the amount of sulfur present in a feed gas is significantly reduced and the sulfur thus obtained is in a commercially useable form without requiring further processing is very desirable. It is also desirable to operate the process at approximately ambient temperature, at a relatively low pressure and without a catalyst. These desires are satisfied by the present invention.

SUMMARY OF THE INVENTION

The present invention contemplates a process for removing a significant amount of oxidizable sulfur containing compounds from a feed gas using ozone and a liquid scrubbing composition to obtain a gas having a reduced sulfur content. Suitable scrubbing compositions include aqueous solutions such as ammonia solutions, and aqueous alkali or alkaline earth metal carbonate suspensions such as suspensions of calcium carbonate, sodium carbonate, potassium carbonate, magnesium carbonate, and the like. The process also yields a sulfate-containing compound suitable for use as an agricultural fertilizer such as ammonium sulfate, or a building material such as gypsum. The present process can be operated at approximately ambient temperature and at a relatively low pressure, although elevated temperatures and pressures can also be utilized. A catalyst is not required.

The sulfur compound containing feed gas can be natural gas, flue gas from the combustion of organic material, gases produced as a by-product of petroleum processes, and like gases. As this feed gas is comingled with ozone or an ozone-containing gas, sulfur oxides, i.e., sulfur dioxide ($SO_2$) and sulfur trioxide ($SO_3$), are produced. These sulfur oxides, in turn, are converted to the corresponding sulfates, including bisulfates, in the scrubbing composition to obtain a product solution.

Optionally, an oxygen-containing gas can be subsequently passed through the product solution to oxidize any bisulfate ions present to sulfate ions.

Numerous other advantages and features of the present invention will become readily apparent from the following detailed description of the invention and the appended claims.

BRIEF DESCRIPTION OF THE DRAWINGS

FIG. 2 is a schematical representation of an experimental system used to determine the efficiency of the present process; and FIG. 3 is a schematical representation of another experimental system used to determine the efficiency of the present process.

DISCLOSURE OF THE INVENTION

Figure 1:
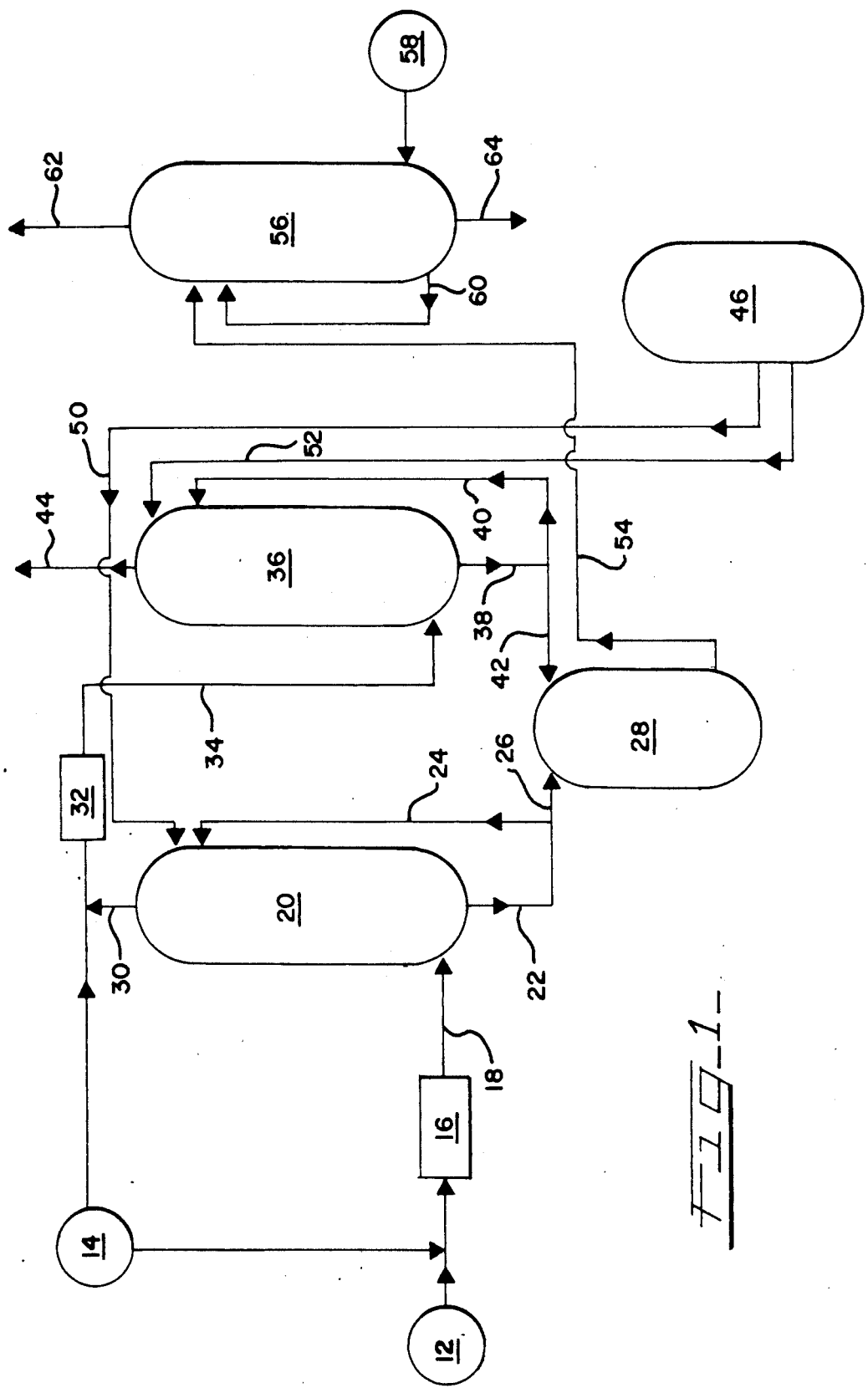
FIG. 1 is a schematic process flow diagram of the process of the present invention.

While the invention is susceptible to embodiments in many different forms, preferred embodiments of the invention are shown. It should be understood, however, that the present disclosure is to be considered as an exemplification of the principles of this invention and is not intended to limit the invention to the embodiments illustrated.

The products obtained from a sulfur-containing gas by the process of the present invention are a gas having a reduced sulfur content as compared to a feed gas and a sulfate-containing compound in solution or suspension.

The process embodying the present invention comprises an oxidation step and a scrubbing step. These two steps can be repeated seriatim to provide a multi-stage desulfurization process, if desired. As will be observed, the operating temperatures and pressures of the present process are relatively low and a catalyst is not required. These are advantageous features from both an economic and a safety perspective.

In the oxidation step, a stream of an oxidizable sulfur-containing feed gas to be sweetened is admixed with an ozone-containing gas. To ensure intimate mixing, the resulting, ozone-containing gaseous admixture is formed by mechanical mixing as by an in-line mixer such as a static mixer. The mole ratio of sulfur in the sulfur-containing gas to ozone in the ozone-containing gas is in the range of about 1:1 to about 1:1.5, preferably about 1:1.2, respectively.

Generally, the gaseous admixture is at a pressure in the range of about atmospheric to about 100 pounds per square inch gauge (psig), preferably less than about 60 psig, more preferably less than about 20 psig while the oxidizable sulfur compounds are oxidized to produce a sulfur oxide-enriched gas stream that is subsequently scrubbed.

The temperature of the gaseous admixture of sulfur-containing gas and ozone-containing gas during the oxidation step is in the range of about 15 to about 35° C., preferably about 25° C.

In the thus produced gaseous admixture the following reactions take place:

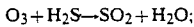

$$O_3 + H_2S \rightarrow SO_2 + H_2O; \quad (1)$$

and

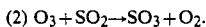

$$(2) \quad O_3 + SO_2 \rightarrow SO_3 + O_2. \quad (2)$$

In this manner, a significant amount of the sulfur present is oxidized to sulfur oxides, i.e., sulfur dioxide and sulfur trioxide, which oxides are then recovered from the resulting sulfur oxide-enriched gas stream by further treatment.

The produced sulfur dioxide and sulfur trioxide are subsequently removed by scrubbing the gas in a gas-liquid contactor using an aqueous liquid scrubbing composition. Suitable scrubbing compositions include aqueous ammonia solutions and aqueous alkali or alkaline earth metal carbonate suspensions such as calcium carbonate, sodium carbonate, potassium carbonate, magnesium carbonate and the like. The aqueous ammonia solution is a preferred scrubbing composition inasmuch as ammonium sulfate, a fertilizer, is obtained. The aqueous calcium carbonate suspension is also a preferred scrubbing composition inasmuch as calcium sulfate, gypsum, is obtained.

Various gas-liquid contactors, also referred to as scrubbers, such as plate columns, packed columns, falling-film columns and the like can be utilized for this purpose. For a detailed description of suitable gas-liquid contacting equipment see Perry et al., *Perry's Chemical Engineers' Handbook*, Sixth Edition, McGraw-Hill Book Company, 18-3 to 18-47, 1984.

General operating conditions of the gas-liquid contactor are given hereinbelow. The operating temperature is in the range of about 15 to about 35° C., preferably about 25° C. The operating pressure is less than about 60 psig, preferably less than about 20 psig. The input pressure of the sulfur oxide containing gaseous admixture is about atmospheric to about 100 psig, preferably less than about 60 psig, more preferably less than about 20 psig.

The active component in the scrubbing composition, ammonia or a previously described carbonate, is present at least in an approximately stoichiometric proportion to the sulfur present in the feed gas as an oxidizable sulfur compound.

In the gas-liquid contactor, sulfur oxides present in the gaseous admixture react with the scrubber composition to produce the corresponding sulfates and sulfites which remain in solution. As a result, the sulfur content of the gaseous stream which exits the gas-liquid contactor is substantially reduced.

The thus treated gaseous stream, having a reduced sulfur content, can be vented to the atmosphere as is or it can optionally be processed further, for example, in a further desulfurization stage or stages. In such a further stage, the previously ozone-treated gas stream is admixed with an additional stream of ozone-containing gas. This resulting gaseous admixture, further enriched with sulfur oxides, is then subjected to a scrubbing treatment in another gas-liquid contactor. The downstream operating conditions for the oxidizing and the scrubbing steps are similar to the operating conditions described hereinabove for the initial treatment steps. In this manner, additional reduction of sulfur content in the exit gas stream can be achieved.

The resulting aqueous product solution can be collected for recovery of a sulfate-containing compound or, if still alkaline, can be used for further processing, e.g. recycled to the scrubber. When the pH of the product solution from the scrubber reaches a pH value of about 7, preferably it is not recycled.

The product solution from the scrubbing or gas desulfurization stage or stages can be further treated with gaseous oxygen, or an oxygen-containing gas such as air, to oxidize any sulfite ions present to sulfate ions. This oxidation can be accomplished with oxygen or ozone as the oxidizing agent, e.g., with oxygen-enriched air, ozone-enriched air, or the like, in a gas-liquid contactor having a similar configuration to the gas-liquid contactors described hereinabove.

General operating conditions of the oxidizing contactor are given hereinbelow. The operating temperature is in the range of about 15 to about 35° C., preferably about 25° C. A substantially stoichiometric amount of the oxidizing agent used is sufficient; however, a slight excess is preferred. The input pressure of the oxidizing agent containing gas is about atmospheric to about 100 psig, preferably less than about 60 psig, more preferably less than about 20 psig.

FIG. 1 is a process flow diagram of the process of the present invention. In this process, feed gas source 12 supplies the gas to be sweetened, i.e., the gas from which oxidizable sulfur is to be removed. This gas, which contains undesirable sulfur compounds, can be natural gas, a gas effluent from the combustion of organic material, tail gas from a Claus type process, a by-product gas from a petroleum refining process or the like. Gas from feed gas source 12 is combined in static mixer 16 with a first ozone-containing gas stream from an ozone source 14 to produce an intimate gas admixture.

The sulfur compounds present react with the ozone to enrich the gas stream with sulfur oxides such as sulfur dioxide and sulfur trioxide which exit the first static mixer 16 in gaseous scrubber feed stream 18 and enter first gas-liquid contactor 20 where the produced sulfur oxides are removed from the gaseous stream.

Scrubbing composition is supplied to the first contactor 20 as a liquid from a fresh scrubbing composition storage tank 46 via scrubbing composition make-up stream 50. For the present illustration, this scrubbing composition is an aqueous ammonia solution. It is understood that the other, above-identified scrubbing compositions can be utilized as well for this purpose. The ammonia dissolved in this scrubbing composition reacts with the sulfur oxides to produce a product solution that includes sulfate and sulfite ions. The latter can be further oxidized to sulfate ions by a further treatment with an oxidizing gas.

The product solution exits the first contactor 20 via stream 22 which is divided into a recycle stream 24 and a return stream 26. Return stream 26 goes to a product solution storage tank 28. Recycle stream 24 is recycled back into the first contactor 20. Ammonia dissolved in this product solution removes sulfur oxides from the gaseous stream as described in the previous paragraph. The product solution then exits the first contactor 20 via stream 22 as before.

The outlet gas of the first contactor 20, the sulfur content of which has been significantly reduced, exits via outlet gas stream 30. Optionally, additional ozone-containing gas from the ozone source 14 can be combined with the outlet gas stream 30. In such an event, the combined outlet gas and ozone-containing gas stream enters a second static mixer 32 which thoroughly mixes the outlet gas and the ozone-containing gas and effects further oxidation of oxidizable sulfur compounds. As previously discussed, the sulfur compounds present react with the ozone to produce more sulfur oxides that are then recovered in a downstream scrubbing step.

Sulfur oxide containing gas stream 34 exits the second static mixer 32 and is the input stream for a second gas-liquid contactor 36. Scrubbing composition is introduced into the second contactor 36 via stream 52 from the storage tank 46 which contains make-up scrubbing composition. The gas stream 34 is treated with the aqueous scrubbing solution in the second contactor 36, thereby forming a product solution as previously discussed.

This product solution exits the second contactor 36 as stream 38 and is recycled and returned to the storage tank 28 as streams 40 and 42, respectively, in a manner similar to that described for the first contactor 20.

Treated gas having a reduced sulfur content exits the second contactor 36 via stream 44. Usually this gas stream contains less than about one percent of the sulfur initially present in the feed gas. The treated gas can then be used as desired, or discharged into the atmosphere, depending upon the type of the feed gas.

Optionally, also as shown in FIG. 1, the product solution contained in storage tank 28 is transported via stream 54 to an oxidation gas-liquid contactor 56 for further oxidation of the sulfur compounds dissolved therein. The product solution contacts an oxidizing gas from a suitable gas source 58, thus converting any sulfite ions present to sulfate ions. Spent oxidizing gas exits from the top of the oxidation contactor 56 via outlet gas stream 62.

The product solution can be recycled via stream 60 if additional oxidizing treatment is desired.

A sulfate solution exits the oxidation contactor 56 via stream 64. When an aqueous ammonia solution is used as the scrubbing composition, the exiting ammonium sulfate solution is suitable for use as a fertilizer. The product solution of storage tank 28 in such a case can be used directly as a fertilizer as well.

Four tests were conducted to evaluate the efficiency of the present process. In the common steps of these tests, air was dried by an air drying filter before entering an ozone generator. The resulting ozone-containing air was then mechanically admixed with a sulfur-containing gas in a static mixer.

For Tests 1 and 2, the resulting admixture was bubbled through distilled water in a flask. The gas was discharged from the flask via two streams. One discharge gas stream entered a sulfur trap containing an alkaline solution of potassium hydroxide (KOH) or sodium hydroxide (NaOH). This trap was utilized to analyze the sulfur content of the discharge gas. The second discharge gas stream entered an ozone trap containing an alkaline solution of potassium iodide (KI). This trap was utilized to analyze the ozone content of the discharge gas.

For Test 3, the flask contained a suspension of calcium carbonate ($CaCO_3$) in distilled water. Subsequent to bubbling the admixture through the suspension, the resulting discharge gas was analyzed for sulfur and ozone content utilizing the traps described hereinabove.

For Test 4, the flask contained distilled water through which the admixture was bubbled. In contrast to the previous tests, the discharge gas was then bubbled through a distilled water/ammonia solution contained in a second flask. The gas exiting this second flask was analyzed for sulfur and ozone content utilizing the traps described hereinabove.

Systems utilized to conduct these four tests are illustrated in FIGS. 2 and 3. As FIGS. 2 and 3 contain many common elements, these elements are described together, it being understood that FIGS. 2 and 3 are separate and distinct systems. The system of FIG. 2 was used for Tests 1 to 3. The system of FIG. 3 was used for Test 4.

In FIGS. 2 and 3, the pressure and flow rate of an air stream from source 111 are adjusted by a throttle valve to the desired levels. The flow rate can be monitored with a flow water. Air stream 104 exits air source 111 and enters an ozone generator 114. An in line air drying filter 113 is positioned in the path of air stream 104. The ozone generator 114 is a commercially available generator which converts oxygen to ozone. Ozone-containing gas exits the ozone generator via stream 105.

Gas source 112 provides a sulfur-containing gas to be treated. The pressure and flow rate of sulfur-containing gas stream 106 are adjusted by known means to the desired levels.

The ozone-containing gas stream 105 and the sulfur-containing gas stream 106 are combined to form combined stream 107 which inputs a static mixer 116. This mixer 116 thoroughly mixes the two gases. The sulfur reacts with the ozone to produce sulfur oxides, i.e., sulfur dioxide ($SO_2$) and sulfur trioxide ($SO_3$). In this manner, a significant amount of the sulfur compounds contained in the gas are converted to sulfur oxides. Stream 118 exits the static mixer 116 and is introduced into a first flask 120. For Tests 1, 2 and 4, first flask 120 contained distilled water through which the sulfur oxide-containing gas is bubbled. For Test 3, first flask 120 contained a suspension of calcium carbonate in distilled water through which the sulfur oxide-containing gas is bubbled.

In FIG. 2, the resulting treated gas exits the first flask 120 via streams 130 and 131 which enter absorbing traps 132 and 134, respectively. The sulfur content of this treated gas, exiting via streams 142 and 144, is significantly reduced as compared to the gas of gas source 112.

In FIG. 3, the resulting treated gas exits the first flask 120 via stream 129 which enters a second flask 140 and passes through a scrubbing composition containing about 6 weight percent ammonia, based on the total weight of the composition, dissolved in water. The sulfur oxides in the treated gas react with the ammonia in the scrubbing composition to form sulfates and bisulfates. After bubbling through the scrubber composition, the scrubbed gas exits via streams 133 and 135 which enter absorbing traps 132 and 134, respectively. The sulfur content of the scrubbed gas exiting via streams 142 and 144 is significantly reduced as compared to the gas of gas source 112.

Traps 132 and 134 are utilized in both FIGS. 2 and 3 to analyze the sulfur and ozone content of the treated gas. Trap 132, used to analyze the sulfur content, contains an alkaline solution of KOH or NaOH. Trap 134, used to analyze the ozone content, contains an alkaline solution of KI.

To determine the sulfur content of the solution in trap 132, an aliquot containing trapped sulfur was analyzed by combining with a solution of $AgNO_3$ using a potentiometer with a selective electrode.

To determine the ozone content of the solution in trap 134, an aliquot containing trapped ozone was analyzed in combination with sodium thiosulfate using a normally volumetric (iodometric) analysis.

The test conditions for Tests 1 to 4 are presented in TABLE I hereinbelow.

TABLE I

| Condition | Test Conditions | | | |
|---|---|---|---|---|
| | Test 1 | Test 2 | Test 3 | Test 4 |
| $H_2S$ entering, (ppm, v/v). | 1000 | 1048 | 1158 | 3400 |
| $O_3$ entering, (ppm, v/v). | 8639 | 10917 | 9545 | 9696 |
| $CO_2$ entering, (%, v/v). | 10 | 10 | 10 | 10 |
| $CH_4$ entering, (%, v/v). | None | 10 | 10 | 10 |
| $N_2$ entering. | Balance | Balance | Balance | Balance |
| Gas flow rate, (liters/min.). | 5 | 5 | 5 | 5 |
| Ozone flow rate, (liters/min.). | 2.5 | 2.5 | 2.5 | 2.5 |
| Pressure of air entering $O_3$ generator, (psig). | 12 | 12 | 12 | 12 |
| Pressure of $O_3$ entering static mixer, (psig). | 8 | 8 | 8 | 8 |
| Medium through which the gas is bubbled. | Distilled water | Distilled water | A suspension of $CaCO_3$ in distilled water | Distilled water with scrubber solution[1] |
| Temperature, (°C.) | 25 | 25 | 25 | 25 |

[1]The scrubber composition contained about 6 percent by weight of ammonia in distilled water.

Tests 1 to 4 were conducted with the intent of optimizing the conditions for oxidation of sulfur in hydrogen sulfide ($H_2S$) with ozone.

Test 4 was also conducted to obtain a material balance with respect to sulfur. Because not all of the $H_2S$ reacts to form $SO_4^=$, but rather $SO_2$ and $SO_3$ are also formed, a second flask containing an aqueous scrubbing solution containing 6 weight percent of ammonia was utilized to retain $SO_2$ and $SO_3$.

TABLE II, provided hereinbelow, shows the material balance for hydrogen sulfide ($H_2S$) and ozone ($O_3$) for tests conducted utilizing the above described systems. Tests 1 to 3 utilized system illustrated in FIG. 2, Test 4 utilized the system illustrated in FIG. 3.

TABLE II

| Test parameter | Test Results | | | |
|---|---|---|---|---|
| | Test 1 | Test 2 | Test 3 | Test 4 |
| Medium(s) through which the gas was bubbled. | Distilled water | Distilled water | A suspension of $CaCO_3$ in distilled water | Distilled water then distilled water/ ammonia solution |
| $H_2S$ entering, (ppm, v/v). | 1000 | 1048 | 1158 | 3400 |
| $H_2S$ exiting, (ppm, v/v). | 0.9 | 1.0 | 0.9 | 20.5 |
| Total millimoles of $H_2S$ entering. | 73.8 | 77.3 | 85.4 | 250.8 |
| Total millimoles of $H_2S$ transformed. | 73.75 | 77.25 | 85.35 | 249.7 |
| Mole conversion of $H_2S$, (%). | 99.93 | 99.93 | 99.94 | 99.56 |
| $O_3$ entering, | 8639 | 10917 | 9545 | 9696 |

TABLE II-continued

| Test parameter | Test Results | | | |
|---|---|---|---|---|
| | Test 1 | Test 2 | Test 3 | Test 4 |
| (ppm, v/v). | | | | |
| O₃ exiting, (ppm, v/v). | 684.7 | 821.6 | 510.1 | 326.2 |
| Total millimoles of O₃ entering. | 287.5 | 363.6 | 317.7 | 300.3 |
| Total millimoles of O₃ transformed. | 251.6 | 320.3 | 291.0 | 283.2 |
| Mole conversion of O₃, (%). | 87.5 | 88.1 | 91.6 | 94.3 |
| Mole ratio of O₃ transformed to H₂S transformed. | 3.41 | 4.14 | 3.41 | 1.13 |
| Initial pH of water in first flask. | 7.2 | 6.4 | 9.2 | 6.2 |
| Final pH of water in first flask. | 1.8 | 1.5 | 6.5 | 2.7 |

The efficiency of a preferred embodiment of the present invention, as illustrated by Test 4, is apparent by comparison with the results of Tests 1 to 3. While the percent mole conversion of hydrogen sulfide is approximately the same for all tests, the utilization of ozone in Test 4 is clearly superior (mole conversion of 94.3% for Test 4 as compared to 91.6% for Test 3, the most efficient among Tests 1 to 3).

The efficient use of ozone in Test 4 is further illustrated by a comparison of the mole ratios of ozone transformed to hydrogen sulfide transformed. For Test 1 to Test 3, the number of moles of ozone required to transform one mole of hydrogen sulfide to the sulfur oxides were 3.41, 4.14 and 3.41, respectively. However, for Test 4, only 1.13 moles of ozone were required to transform one mole of hydrogen sulfide to the sulfur oxides. The reaction with ammonia in the scrubbing solution is more effective because the mole transformation ratio of ozone to hydrogen sulfide is 1.13:1. This is true even through this is not the only reaction present.

The other possible reactions are as follows.

In the gaseous state:

$$O_3 + H_2S \rightarrow SO_2 + H_2O \text{ (primary)};$$

and $$O_3 + SO_2 \rightarrow SO_3 + O_2 \text{ (secondary)}.$$

In the solution state:

$$SO_4 + H_2O \rightarrow H_2SO_3;$$

$$H_2SO_3 + O_3 \rightarrow H_2SO_4 + O_2;$$

and $$SO_3 + H_2O \rightarrow H_2SO_4.$$

It is significant that at a mole ratio of ozone to hydrogen sulfide of about 1:1 the conversion is more effective than when an excess of ozone is present. This is illustrated by the following reactions:

$$H_2S(g) + 3O_3(g) \rightarrow SO_2(g) + H_2O(g) + 3O_2(g);$$

and $$H_2S(g) + O_3(g) \rightarrow SO_2(g) + H_2O(g).$$

TABLE III shows the millimoles of SO₄⁼ retained in the respective flasks. As Test 3 utilized a suspension of calcium carbonate (CaCO₃) in distilled water, it could not be determined how much CaSO₃ was present.

TABLE III

| | Material Balance of SO₄⁼ | | | | |
|---|---|---|---|---|---|
| | | | | Test 4 | |
| Millimoles of SO₄⁼ | Test 1 | Test 2 | Test 3 | First flask | Second flask |
| retained | 5.0 | 6.9 | — | 6.8 | 73.4 |

For Tests 1 and 2, the millimoles of SO₄⁼ retained in the distilled water containing flask are 5 and 6.9, respectively. For the first flask of Test 4, which also contained distilled water, 6.8 millimoles were retained. Equilibrium was thus reached at 5 to 6.9 millimoles of SO₄⁼ which corresponds to the point in which the solution is acidic. This is characteristic of an acidic gas which should be absorbed at a neutral or alkaline pH. A solution having a neutral or alkaline pH transforms the SO₄⁼ to SO₂ or, to a lesser degree, to SO₃.

Test 4 confirms this. The ammonia containing scrubber solution retained 73.4 millimoles of SO₄⁼. This is because an alkaline pH existed in this second flask even though only 6% by weight of ammonia was present in scrubber solution. This means that with a more efficient absorption system and at a greater alkaline concentration, substantially all of the sulfur in the escaping gases is recoverable independently of the neutralization of the ammonia hydroxide by CO₂. This neutralization produces (NH₄)₂CO₃ which is also sufficiently alkaline for the purposes of the present invention.

This invention has been described in terms of specific embodiments set forth in detail. It should be understood, however, that these embodiments are by way of illustration only, and that the invention is not necessarily limited thereto. Modifications and variations will be apparent from this disclosure and may be resorted to without departing from the spirit of this invention, as those skilled in the art will appreciate. Accordingly, such variations and modifications of the disclosed products are considered to be within the purview and scope of this invention and the following claims.

We claim:

1. A process for removing hydrogen sulfide from a gas stream containing such compound which comprises the steps of:
    commingling said gas stream with ozone in an amount sufficient to oxidize in gaseous in gaseous phase at least a portion of the hydrogen sulfide present to a sulfur oxide and to produce a sulfur oxide-enriched gas stream; and contacting the sulfur oxide-enriched gas stream with an aqueous liquid scrubbing composition for a time period sufficient to decrease sulfur oxide concentration in said sulfur oxide-enriched gas stream and to increase sulfate ion concentration in the scrubbing composition and thereafter recorvering a sulfate-containing compound from said scrubbing composition.

2. The process in accordance with claim 1 wherein the aqueous liquid scrubbing composition is an aqueous ammonia solution.

3. The process in accordance with claim 1 wherein the aqueous liquid scrubbing composition is an aqueous alkali metal carbonate suspension.

4. The process in accordance with claim 1 wherein the aqueous liquid scrubbing composition is an aqueous alkaline earth metal carbonate suspension.

5. The process of claim 1 wherein said commingling is in a static mixer.

6. The process of claim 4 wherein said alkaline earth metal is calcium and gypsum is recovered as a product of the process.

7. A process for sweetening a hydrogen sulfide containing gas which comprises the steps of:

providing an ozone-containing gas;

combining said hydrogen sulfide containing gas with said ozone-containing gas to form a gaseous admixture and oxidizing at least a portion of the sulfur present in the gaseous admixture to a sulfur oxide in gaseous phase;

providing a liquid scrubbing composition selected from the group consisting of an aqueous ammonia solution, aqueous alkali metal carbonate suspension and aqueous alkaline earth metal carbonate suspension;

contacting the sulfur oxide-containing gaseous admixture with the scrubbing composition for a time period sufficient to produce a first product solution containing sulfate ions; and recovering a gas having a reduced sulfur content.

8. The process in accordance with claim 7 which further comprises:

combining the recovered gas having a reduced sulfur content with a second ozone-containing gas to form a second gaseous admixture and oxidizing at least a portion of the sulfur present in the second gaseous admixture to sulfur oxide;

contacting the second sulfur oxidecontaining gaseous admixture with the scrubbing composition for a time period sufficient to produce a second product solution;

recovering a gas having a further reduced sulfur content; and recovering a sulfate-containing compound from a product solution.

9. The process in accordance with claim 7 in which said first product solution contains sulfite ions and the process further comprises the step of contacting said first product solution with an oxygen-containing gas for a time period sufficient to transform said sulfite ions to sulfate ions.

10. The process in accordance with claim 7 in which the process is carried out at a temperature in a range of about 15° to about 35° C. and a pressure of less than about 60 psig.

11. The process in accordance with claim 7 in which the process is carried out at a temperature of about 25° C., and a pressure less than about 20 psig.

12. The process in accordance with claim 7 wherein sulfur in the hydrogen sulfide containing gas and ozone in the ozone-containing gas are present in a mole ratio in the range of about 1:1 to about 1:1.5, respectively.

13. The process in accordance with claim 7 wherein sulfur in the hydrogen sulfide containing gas and ozone in the ozone-containing gas are present in a mole ratio of about 1:1.2, respectively.

14. The process in accordance with claim 7 wherein the scrubbing composition is an aqueous ammonia solution.

15. A process in accordance with claim 7 in which the process is carried out at a temperature of about 25° C. and a pressure less than about 20 psig, a mole ratio of sulfur in the hydrogen sulfite containing gas to ozone in the ozone-containing gas is about 1:1.2, respectively, and wherein the scrubbing composition is an aqueous ammonia solution in which ammonia is present in at least a stochiometric proportion to the sulfur of the sulfur-containing gas.

16. The process of claim 14 wherein ammonium sulfate is recovered as a product of the process.

17. A process for sweetening a hydrogen sulfide containing gas which comprises commingling the hydrogen sulfide containing gas with an ozone-containing gas to oxidize at least a portion of said hydrogen sulfide in the gaseous state, thereafter contacting the resulting gaseous admixture with an aqueous scrubbing composition for a time period sufficient to produce a gas having a reduced sulfur content and thereafter recovering a sulfate-containing compound from said scrubbing composition.

18. The process in accordance with claim 17 wherein the scrubbing composition is an aqueous ammonia solution.

19. The process in accordance with claim 17 wherein the aqueous scrubbing composition contains a carbonate suspension selected from the group consisting of calcium carbonate, sodium carbonate, potassium carbonate, magnesium carbonate, and mixtures thereof.

* * * * *

UNITED STATES PATENT AND TRADEMARK OFFICE
CERTIFICATE OF CORRECTION

PATENT NO. : 5,047,218

DATED : September 10, 1991

INVENTOR(S) : Pedro Cesar Ortega et al.

It is certified that error appears in the above-identified patent and that said Letters Patent is hereby corrected as shown below:

Col. 1, line 30, delete "a".

Col. 9, line 49, "$SO_4+H_2O \rightarrow H_2SO_3;$" should be -- $SO_2+H_2O \rightarrow H_2SO_3;$ --.

Col. 10, line 67 delete "in gaseous" (first occurrence).

Col. 11, line 8, "recorvering" should be -- recovering --.

Col. 11, line 51, "oxidecontaining" should be -- oxide-containing --.

Col. 12, line 30, "sulfite" should be -- sulfide --.

Signed and Sealed this

Twenty-third Day of February, 1993

*Attest:*

STEPHEN G. KUNIN

*Attesting Officer*      *Acting Commissioner of Patents and Trademarks*